Sept. 1, 1953 E. G. CROOKS 2,650,770
DRIVER FOR SPOOLS OR BOBBINS
Filed May 14, 1952
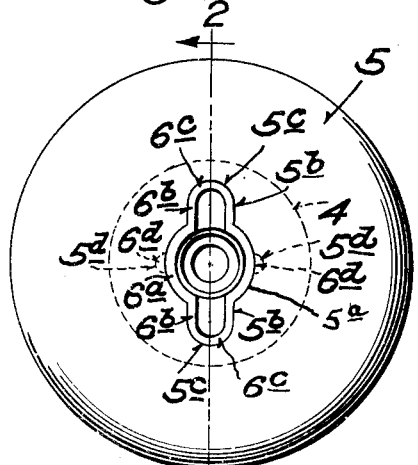
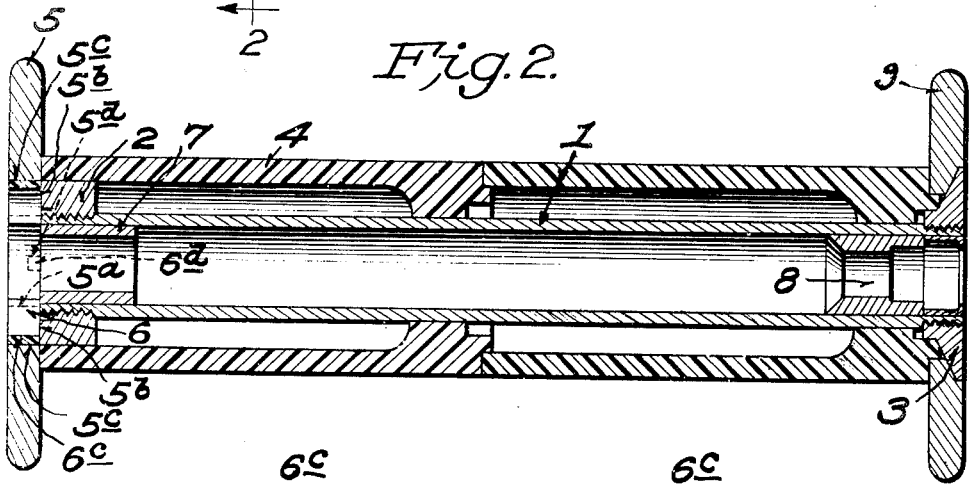
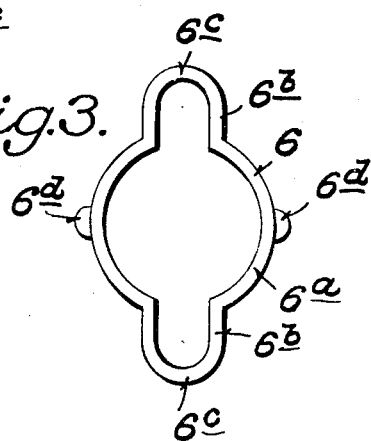
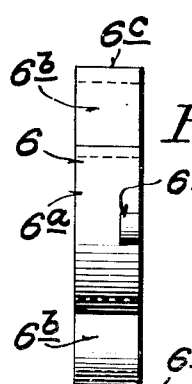
INVENTOR
Earl G. Crooks
BY Dowell and Dowell
ATTORNEYS Patented Sept. 1, 1953

2,650,770

UNITED STATES PATENT OFFICE 2,650,770

DRIVER FOR SPOOLS OR BOBBINS

Earl G. Crooks, Binghamton, N. Y., assignor to Lestershire Spool and Manufacturing Company, Johnson City, N. Y., a corporation of New York Application May 14, 1952, Serial No. 287,743

8 Claims. (Cl. 242—46.4)

This invention is a novel improvement in drivers for spools and bobbins; and the principal object thereof is to provide a simple, novel and efficient driver adapted to be removably inserted in a head at the end of a spool or bobbin, for engagement with the driving lug, said driver being preferably formed of nylon which material has great durability and wearing qualities, but being deformable is readily replaceable in and removable from the corresponding recess in the spool or bobbin by slight deformation thereof, said nylon driver being normally retained in the said recess by means of integral lugs engaging corresponding notches in the walls of the recess into which the driver fits.

I will explain the invention with reference to the accompanying drawing, which illustrates one practical embodiment thereof, to enable others familiar with the art to adopt and use the same; and will summarize in the claims, the novel features of construction, and novel combinations of parts, for which protection is desired.

In said drawings:

Figure 1 is an end view of the head of the spool or bobbin, showing my novel nylon driver positioned in the recess therein.

Fig. 2 is a longitudinal section through a spool or bobbin showing the nylon driver inserted in the head thereof.

Fig. 3 is an enlarged top plan view of the nylon driver, detached.

Fig. 4 is a side elevation of the nylon driver, detached.

Fig. 5 is another side elevation of the nylon driver, detached.

As shown, the bobbin may be of any desired construction, but preferably consists of a center tube 1, upon which are mounted washers 2, 3 at the respective ends thereof, and around the center tube 1 is mounted a barrel 4 of any desired material, the said spool or bobbin being provided with heads 5 and 9 at the ends of the barrel, head 5 being the base head. If desired, bushings 7, 8 may be provided in the ends of center tube 1. The particular means of locking the parts together forms no part of my present invention.

In the center of the base head 5 is a recess adapted to receive a moulded driver of nylon or other resilient deformable material, said recess having a central circular portion 5a (Fig. 1) coaxial with the center tube 1, and having diametrically opposed radial extensions 5b, 5b which are provided with semi-circular end walls 5c, 5c. The recesses 5a, 5b, 5c may be of depth to extend entirely through the base head 5 or may be of lesser depth.

My novel nylon or other deformable driver 6 is shown in Figs. 3, 4 and 5, the same having a particular central portion 6a of external diameter to suit the internal diameter of the recessed portion 5a of base head 5, the driver also having diametrically opposed extensions 6b of U-shape provided with semi-circular rounded ends 6c, the portions 6b and 6c being adapted to snugly fit the corresponding portions 5b, 5c of the recess in the head 5, as clearly shown in Figs. 1 and 2.

The driver 6, being formed of nylon, or other deformable material, can readily be deformed so that the opposite sides of the central parti-circular portion 6a between the extensions 6b can be squeezed together to permit the driver 6 to be inserted in the recess 5a, 5b, 5c in the base of head 5, whereupon upon release of such pressure the nylon driver will again expand into the position shown in Figs. 1 and 2.

In order to retain the driver 6 within the recess 5a, 5b, 5c, I provide diametrically opposed integral lugs 6d at the inner end of the central portion 6a, which lugs 6d project outwardly as shown in Figs. 3, 4 and 5; and which lugs are adapted to engage corresponding notches 5d (Figs. 1 and 2) in the wall 5a of the base head 5, so that when the nylon driver expands after insertion in the recess 5a, 5b, 5c, the lugs 6d will enter the notches 5d in the central portion of the recess in base head 5, thereby preventing the driver from moving axially out of the recess in the base head 5 until the nylon driver is again deformed by squeezing pressure on the portion 6a so as to permit retraction of the lugs 6d from the notches 5d.

My novel driver 6 is therefore readily insertable in and removable from the correspondingly shaped recess 5a, 5b, 5c in the base head 5 merely by deforming the driver by applying squeezing pressure at opposite sides of the central portion 6a, but when said pressure is removed the nylon driver will return to its original moulded shape shown in Fig. 3 to fill the recess.

I do not limit my invention to the exact form shown in the drawing, for obviously changes may be made therein within the scope of the claims.

I claim:

1. In a spool, bobbin or the like having a barrel provided with a head at one end having a drive spindle recess therein disposed coaxially of said barrel; a deformable driving bushing within said recess adapted to snugly fit the correspondingly shaped recess in the head; and lugs on the bushing adapted to engage correspondingly shaped notches in the wall of the recess to maintain the bushing in said recess.

2. In a spool or bobbin as set forth in claim 1, said bushing being formed of moulded nylon to normally fit said recess and notches, said bushing being insertable and removable from said recess and notches by applying squeezing pressure on opposite sides of the bushing in alignment with said lugs, and said bushing returning to normal shape when said pressure is released.

3. In a spool, bobbin or the like having a barrel provided with a head at one end having a drive spindle recess therein disposed coaxially of said barrel, said recess having a parti-circular central portion provided with radial extensions; a deformable driving bushing within said recess having a parti-circular central portion provided with radial extensions adapted to snugly fit the correspondingly shaped central portion and radial extensions of the recess in the head; and lugs disposed at the inner end of the central portion of the bushing adapted to engage correspondingly shaped notches in the wall of the central portion of the recess in the head, to maintain the bushing in said recess.

4. In a spool or bobbin as set forth in claim 3, said bushing being formed of moulded nylon to normally fit said recess and notches, said bushing being insertable and removable from said recess and notches by applying squeezing pressure on opposite sides of the central portion of the bushing in alignment with said lugs, and said bushing returning to normal shape when said pressure is released.

5. In a spool, bobbin or the like having a barrel provided with a head at one end having a driving spindle recess therein disposed coaxially of said barrel, said recess having a parti-circular central portion provided with radial extensions; a deformable driving bushing within said recess having a parti-circular central portion provided with U-shaped radial extensions adapted to snugly fit the correspondingly shaped central portion and radial extensions of the recess in the head; and outwardly extending lugs disposed at the inner end of the central portion of the bushing intermediate the U-shaped extensions adapted to engage correspondingly shaped notches in the wall of the central portion of the recess in the head to maintain the bushing in said recess.

6. In a spool or bobbin as set forth in claim 5, said bushing being formed or moulded nylon to normally fit said recess and notches, said bushing being insertable and removable from said recess and notches by applying squeezing pressure on opposite sides of the central portion of the bushing in alignment with said lugs, and said bushing returning to normal shape when said pressure is released.

7. In a spool, bobbin or the like having a barrel provided with a head at one end having a driving spindle recess therein disposed coaxially of said barrel, said recess having a parti-circular central portion provided with diametrically opposed radial extensions; a deformable driving bushing within said recess having a parti-circular central portion provided with diametrically opposed U-shaped radial extensions adapted to snugly fit the correspondingly shaped central portion and radial extensions of the recess in the head; and outwardly extending diametrically opposed lugs disposed at the inner end of the central portion of the bushing intermediate the U-shaped extensions adapted to engage correspondingly shaped notches in the wall of the central portion of the recess in the head to maintain the bushing in said recess.

8. In a spool or bobbin as set forth in claim 7, said bushing being formed of moulded nylon to normally fit said recess and notches, said bushing being insertable and removable from said recess and notches by applying squeezing pressure on opposite sides of the central portion of the bushing in alignment with said lugs, and said bushing returning to normal shape when said pressure is released.

EARL G. CROOKS.

References Cited in the file of this patent

UNITED STATES PATENTS

| Number | Name | Date |
| --- | --- | --- |
| 729,095 | Rabbeth | May 26, 1903 |
| 1,869,408 | Bungay | Aug. 2, 1932 |

FOREIGN PATENTS

| Number | Country | Date |
| --- | --- | --- |
| 316,417 | Great Britain | Aug. 1, 1929 |
| 332,546 | Great Britain | July 21, 1930 |
| 614,092 | Great Britain | Dec. 9, 1948 |